(12) United States Patent
Bolin

(10) Patent No.: US 8,499,491 B2
(45) Date of Patent: Aug. 6, 2013

(54) METHOD AND APPARATUS FOR LANDSCAPE EDGING

(76) Inventor: Joel W. Bolin, Hempstead, TX (US)

( * ) Notice: Subject to any disclaimer, the term of this patent is extended or adjusted under 35 U.S.C. 154(b) by 144 days.

(21) Appl. No.: 12/660,182

(22) Filed: Feb. 22, 2010

(65) Prior Publication Data

US 2012/0311927 A1    Dec. 13, 2012

(51) Int. Cl.
*A01G 1/08*    (2006.01)
(52) U.S. Cl.
USPC .............................................. 47/33
(58) Field of Classification Search
USPC ................ 47/32.4, 32.5, 32.6, 33; 52/102
See application file for complete search history.

(56) References Cited

U.S. PATENT DOCUMENTS

| | | | | |
|---|---|---|---|---|
| 992,529 A | * | 5/1911 | Abraham | 47/19.1 |
| 1,945,784 A | * | 2/1934 | Myer | 404/136 |
| 3,485,449 A | * | 12/1969 | Wilson | 239/201 |
| 4,508,319 A | * | 4/1985 | Tappan et al. | 256/19 |
| 5,301,461 A | * | 4/1994 | Zwier | 47/33 |
| 5,941,018 A | * | 8/1999 | Herrema | 47/33 |
| 6,629,383 B2 | * | 10/2003 | Allen et al. | 47/33 |
| 7,409,796 B2 | * | 8/2008 | Sacks | 47/33 |
| 2009/0064571 A1 | * | 3/2009 | Fakhari | 47/33 |

* cited by examiner

*Primary Examiner* — Rob Swiatek
*Assistant Examiner* — Ebony Evans
(74) *Attorney, Agent, or Firm* — James L. Jackson

(57) ABSTRACT

A landscape edging system has edging strip material with ends having a laterally extending projection and adapted for overlapping relation when assembled and having end edges disposed in edge to edge relation. A stake clip member is mounted to each of the laterally extending projections and defines a stake receptacle. An installation stake extends through the vertically aligned stake receptacles and secures the end portions of adjacent strips of landscape edging material in said overlapping edge to edge relation and supports the landscape edging strip material in upright position. The installation stake and stake receptacles have interacting wedge shaped geometry that locks the ends of the strip material in assembly.

13 Claims, 3 Drawing Sheets

METHOD AND APPARATUS FOR LANDSCAPE EDGING

BACKGROUND OF THE INVENTION

1. Field of the Invention

The present invention relates generally to landscape edging to define the border of landscape beds that are located adjacent dwellings and other building structures. More particularly, the present invention concerns landscape strip material composed of composite polymer material that can be extruded through dies and cut to desired lengths for use. Also, the present invention concerns clip members that are affixed to the landscaping strips and receive stake members to provide for installation of the landscape edging strips and also provide efficient and durable support therefor.

2. Description of the Prior Art

Landscape edging systems that are widely used at the present time are typically in the form of thin metal strip material that is formed from sheet material and defines receptacles for receiving metal support stakes that are also formed from sheet metal. Landscape edging systems of this nature define rather sharp upstanding edges that can be dangerous in the event a person should step on them or fall on them. Typically, the strip material of these landscaping systems is painted a dark color, such as green or black, so that they have an appearance that blends with the colors of the grass, plants and shrubs of typical landscaping. The landscape edging is not visibly obvious, especially during conditions of poor light, thus further exacerbating the potential that persons can step or fall on the sharp edged strip material and can become injured. Typically, to minimize the cost of landscape edging systems the landscaping strip material is composed of a ferrous sheet material is covered only by paint and thus tends to rust and become deteriorated and weakened over a period of time. Even when the metal landscape strip material is plated with zinc during a galvanizing process, the coating will fail within a rather short period of time due to its contact with the soil and the base sheet material will begin to deteriorate by corrosion. The thin sheet metal will often rust completely through and thus require replacement.

SUMMARY OF THE INVENTION

It is a principal feature of the present invention to provide a novel landscape edging system employing composite polymer strip material and providing stake receiving clips and stakes to provide for simple and efficient installation thereof.

It is another feature of the present invention to provide a novel landscape edging system having landscaping strip material that does not present sharp and dangerous exposed edges that might cut or otherwise injure persons moving in the vicinity of the landscaped beds.

It is also a feature of the present invention to provide a novel landscape edging system having landscape edging strips that are composed of polymer material and have stake clips that fixed to laterally extending interfitting end portions thereof. The stake clips each define stake receptacles that are positioned in superposed aligned relation when the laterally extending end portions of adjacent landscape strips are assembled. The aligned stake receptacles receive a stake member that accomplishes predetermined alignment of the end portions of adjacent landscape strips and assist in providing an efficiently stabilized landscape edging installation of pleasing appearance and exceptional durability.

Briefly, the various objects and features of the present invention are realized through the provision of strips landscape edging material that are manufactured of extruded or otherwise formed polymer material that will not tend to rot or deteriorate and which is treated for resistance to ultraviolet light and may have desired color characteristics. The landscape strip material may be passed between formed rollers during manufacture so that the strip material has exterior surfaces that resemble the surface of a strip of wood or exterior surfaces of other desired appearance. The strip material is manufactured to have width and thickness dimensions that permit it to be somewhat flexible so that it may be installed straight or may be bent to the desired curved shapes of walkways, garden edges and the like. The landscape strip material has interfitting end portions of a configuration permitting pairs of stake clips to be fixed to the strip material so that the stake clips will be positioned in superposed relation when the adjacent ends the strip material are assembled. The stake clips each define stake receptacles so that a single stake may be extended through the superposed stake receptacles of each of the pair of stake clips and driven into the soil to secure the adjacent ends of the landscaping material in properly interfitting and efficiently stabilized assembly. The stake receptacles that are defined by the stake clips are internally tapered and correspond to the externally tapered configuration of upper portions of the stake members. This feature causes the end portions of the landscape strip material to be drawn into interfitting relation as the stake is driven through the stake receptacles and into the soil.

The stake clips and the stakes are preferably cut or punched from sheet metal, such as galvanized steel, by a die cutting operation that forms the stake receptacles and forms sharp pointed attachment finger members that penetrate the thickness of the landscape strip material to a desired extent for permanently securing the stake clips to the landscape strip material.

For supporting and positioning the landscaping strip material relative to the surface of the soil, support stakes are formed to define support fingers that project laterally from the body of the support stakes sufficiently to accommodate the thickness of the landscape strip material. The support stakes may have single support fingers or two or more support fingers as preferred by installation personnel or as determined by the condition of the soil into which they are driven.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

In the Drawings:

FIG. 1 is an elevation view showing assembly of strips of landscape edging material embodying the principles of the present invention by means of a stake having a wedge shaped upper portion that is received by internally tapered stake receptacles of stake receiving clips that are fixed to assembled interlocking ends of the landscape edging material;

FIG. 1A is a sectional view taken along line 1A-1A of FIG. 1 and showing permanent assembly of a stake clip member to the landscape edging strip material;

FIG. 2 is an exploded elevation view showing the joint geometry of the landscaping edging material of FIG. 1 and further showing the stake receiving clips and further showing a stake member partially extended through receptacles of the stake receiving clips;

FIG. 3 is an elevation view showing the lower edge portion of the landscape edging strip material being received in supported relation with the support fingers of support stake members;

FIG. 4 is a side elevation view showing the a support stake member and illustrating positioning of the lower edge portion of the landscape edging strip material in supported relation therewith; and FIG. 5 is a section view taken along line 5-5 of FIG. 3 and showing further details of the support stake member.

DETAILED DESCRIPTION OF PREFERRED EMBODIMENT

Figure 1:
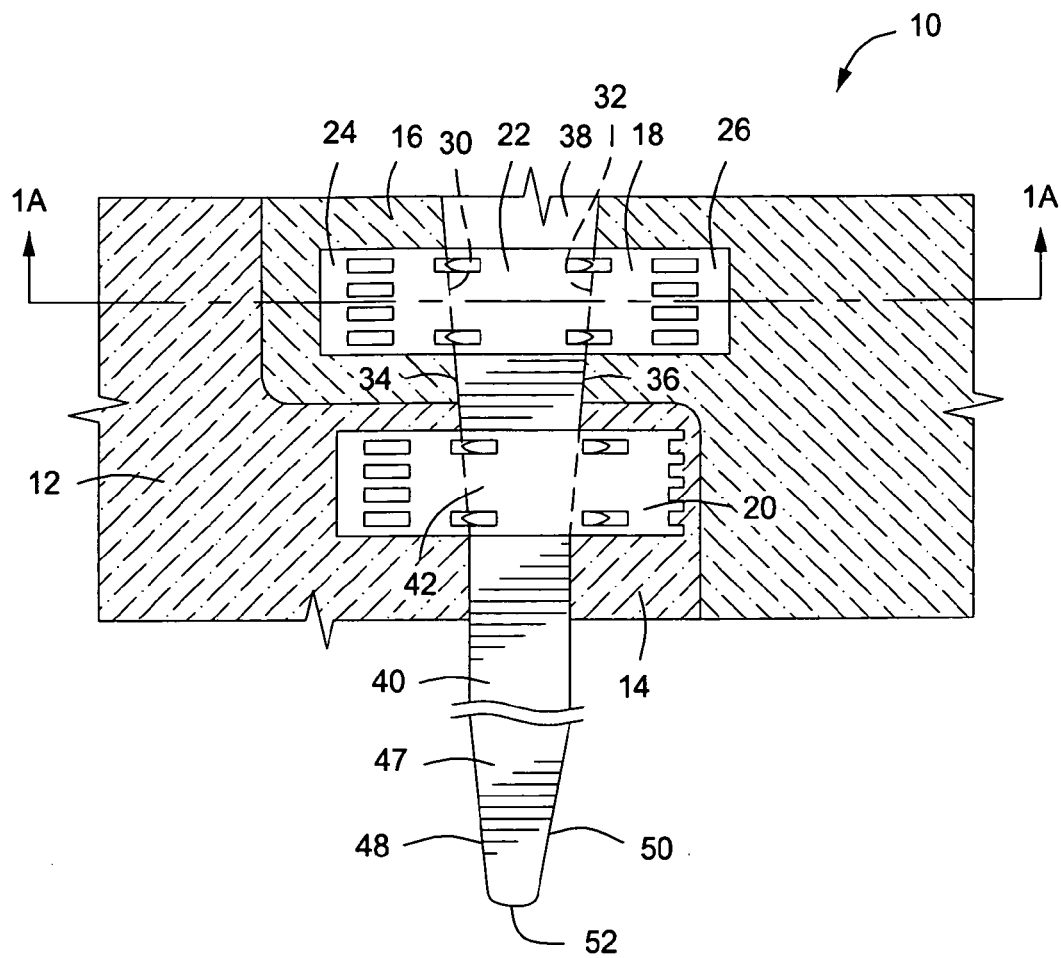
Figure 2:
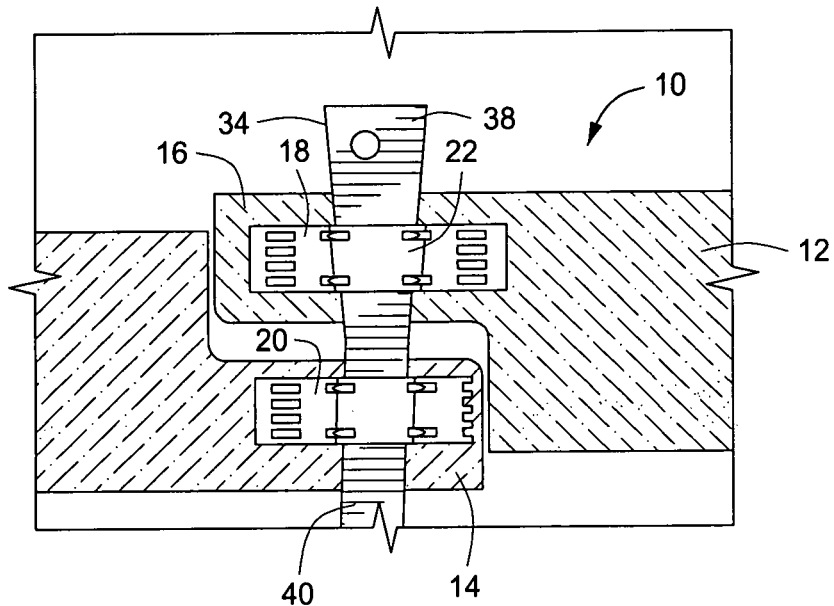

Referring now to the drawings and first to FIGS. 1 and 2, a landscaping edging system is shown generally at 10 and comprises landscape edging strip material, shown generally at 12 having interfitting end sections 14 and 16. Each of the end sections 14 and 16 define laterally extending end projections of less vertical width as compared with the vertical width of the landscape strip material. The end projections are oppositely oriented to establish an overlapping or superposed relationship as shown in FIGS. 1 and 2, thus positioning edges of the end sections 14 and 16 in substantially edge to edge contact with one another to provide for predetermined interfitting alignment of the ends of the strip material when the installation of the landscape edging has been completed.

For the purposes of the present invention the landscape edging strip material is composed of any of a wide range of materials that are sufficiently soft as to facilitate penetration by small metal fastener elements or fingers as will be explained in detail below. The landscape edging strip material is preferably composed of an extruded polymer material or polymer composite, such as polypropylene and polyethylene, though it is within the spirit and scope of the present invention to manufacture the landscape edging strip material from other materials such as wood, rubber or rubber-like materials. It is preferable to employ a landscape edging strip material that is resistant to rot and other damaging effects of weather and resistant to the damaging effects of ultraviolet light. Preferably the landscape edging strip material has a thickness in the range of from about 3/16 inch to about 1/2 inch and preferably about 1/4 inch and has a width in the range of from about 3 inches to about 5 inches and preferably a width of about 4 inches. However, the landscape edging strip material may have any other thickness or vertical width as is suitable for the needs of the user. Following extrusion of the landscape edging strip material and before it has become hardened, the strip material is passed between rollers that have decorative surface geometry, such as the appearance of wood grain, to provide the strip material with a pleasing appearance. During manufacture of the landscape edging strip material from polymer constituents a desired color, such as brown, green or black is incorporated into the polymer composition to provide the completed landscape edging strip material with a color that is desired by the end user.

Figure 1A:
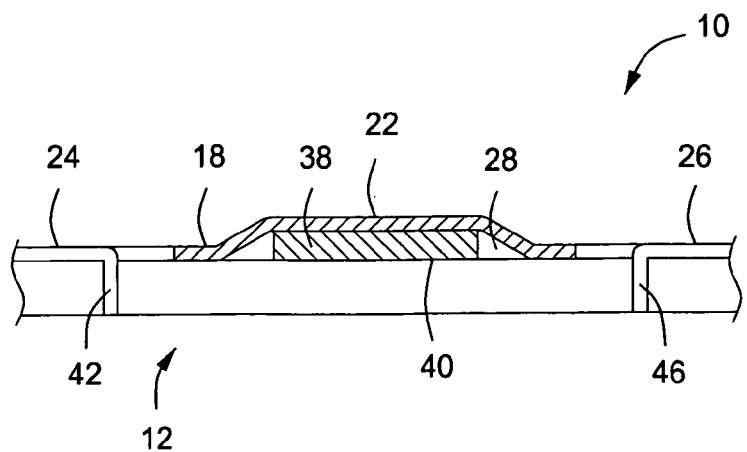

Each joint between adjacent ends of the landscape strip material 12 is stabilized and secured in pleasing assembly. Each end joint section incorporates upper and lower stake clips 18 and 20. The upper stake clip 18 defines an intermediate clip portion 22 and attachment wings 24 and 26. The intermediate clip portion 22 of the upper stake clip is bent during the clip forming operation so as to project laterally beyond the plane of the attachment wings 24 and 26 as shown in FIG. 1 and in the sectional view of FIG. 1A, thus defining an upper stake receptacle 28. As shown in FIG. 1 by downwardly converging broken lines at 30 and 32, the upper stake receptacle 28 has internal downwardly converging side surfaces that are engaged by corresponding downwardly converging side edges 34 and 36 that are defined by an upper wedging portion 38 of a stake member 40. A lower internally tapered stake receptacle is defined by an intermediate laterally offset portion 42 of the lower stake clip 20.

The attachment wings 24 and 26 are provided with multiple sharp strip penetrating fingers 44 and 46 that are defined and oriented by a metal punching and deforming operation so that each of the sharp strip penetrating fingers is oriented in substantially normal relation with respect to the co-planar attachment wings 24 and 26. Each of the multiple strip penetrating fingers 44 and 46 has a sharp pointed end and penetrates the landscaping strip material to substantially its complete thickness as the upper stake clip is forced against the landscaping strip material by an attachment press or by means of other suitable assembly machine. If desired, the multiple strip penetrating fingers can be driven into the landscaping strip material by a hammering operation, assuming that the strip penetrating fingers do not become bent by the force of penetrating the strip material.

The lower stake clip 20 is of similar configuration and purpose as discussed above in connection with the upper stake clip 18, the difference essentially being that the central portion 42 of the lower stake clip 20 is of smaller tapered dimension so as to establish a wedging relation of the downwardly converging edges 34 and 36 of the stake 40 with correspondingly tapered internal surfaces of its stake receptacle. These features permit the substantially straight downwardly converging edges 34 and 36 of the stake member 40 to establish wedging and aligning relation with both the upper and lower stake clips so that the stake will cause the end portions of the landscaping strips to be drawn into precise interfitting relation. In this manner, the end portions of the adjacent landscaping strips are secured in stabilized relation with one another and the interfitting ends will be retained in such stabilized assembly for long periods of time without becoming misaligned. As shown at the right hand portion of the lower stake clip 20, it is to be borne in mind that portions of the attachment wings may be cut away as long as the strip penetrating fingers establish and maintain penetration of the strip material sufficiently to maintain the stake clip in permanent assembly with the landscape strip material.

FIG. 2 is an exploded elevation illustration showing assembly of the landscaping strip material during its installation. The installation stake member 40 is simply extended through the aligned stake receptacles of the upper and lower landscaping clip members 18 and 20 until alignment of the ends of the landscaping strips have been achieved by the wedging action of the downwardly converging edges 34 and 36 of the stake member with the inner edge surfaces of the stake receptacles of the upper and lower stake clips 18 and 20. At its lower end portion 47 the stake member 40 defines downwardly converging edges 48 and 50 that form an essentially pointed end to facilitate soil penetration even when the soil is somewhat hard. If desired, the lower end edge 52 of the stake may be rounded as shown or it may be defined by intersecting converging edges forming a very sharp point.

Figure 3:
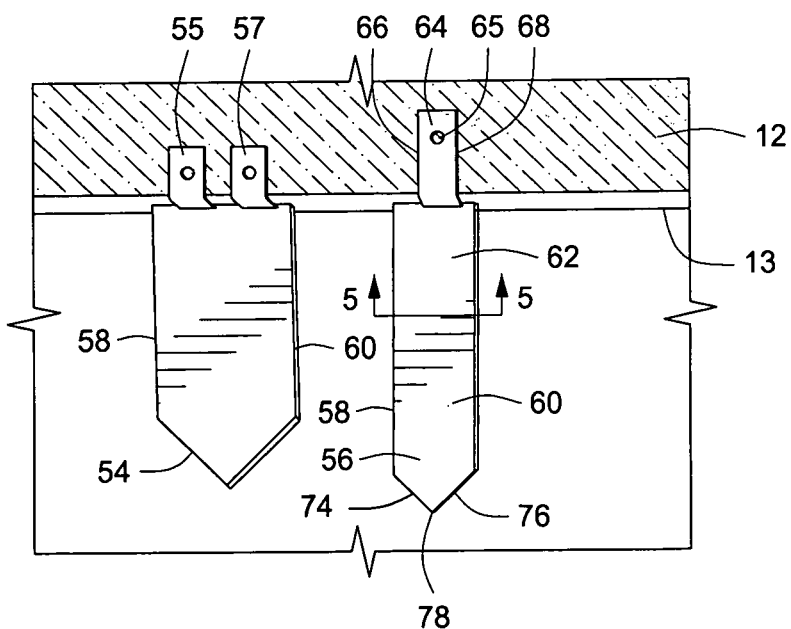

Intermediate the assembled interfitting ends of the landscaping strip material it will often be appropriate to provide support for the landscaping strip material so that its upper edge will establish a pleasing appearance regardless of the configuration of the surface of the soil. As shown in FIG. 3, support stake members for the landscape strip material 12 may conveniently take the form that is shown generally at 54 and 56 depending upon the needs and desires of design and installation personnel and depending on the character of the soil into which the support stakes will be driven. In each case, the stake members are formed from sheet metal material such as galvanized steel and define rounded or laterally offset generally parallel edge portions 58 and 60 which provide protection against the possibility of cutting and also serve to enhance the structural integrity of the stake. If desired however, the support stakes may be formed of any of a number of suitable materials, such as polymer or combinations of wood, metal and polymer, without departing from the spirit and scope of the present invention. In comparison, the stake member 54 is of greater width as compared with the support stake member 56 and is provided with a pair of support fingers 55 and 57 while the more narrow support stake 56 is provided with a single, centrally located support finger 64. Construction and function of the support stakes 54 and 56 is essentially the same, but provides the designer and installer of the system with some latitude, depending on the character of the soil into which the support stakes will be driven.

Figures 4, 5:
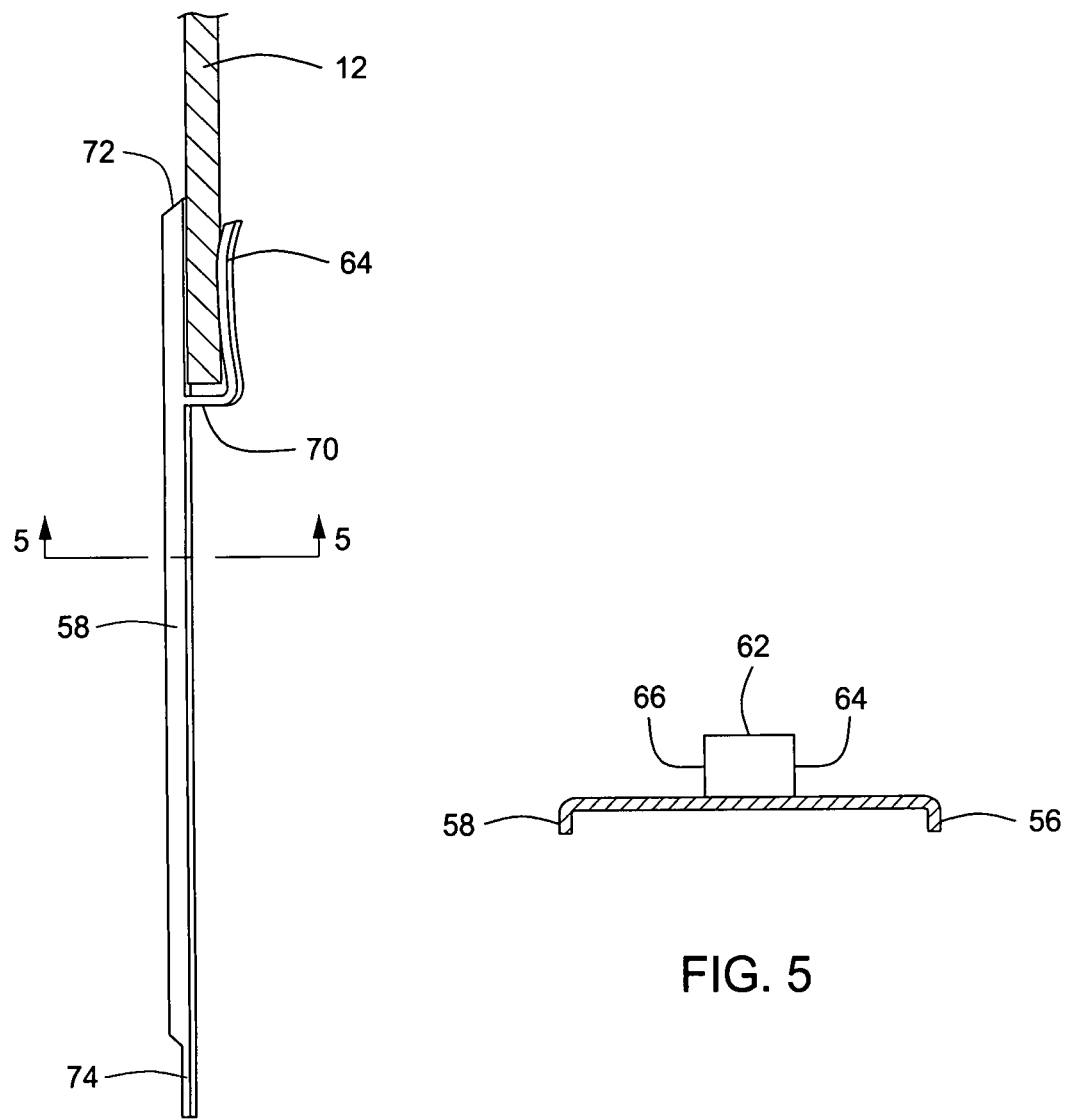

A side elevation view of the support stake 56 is shown in FIG. 4 so that the rounded or offset edge portion 58 is clearly evident. At its upper portion, the central web portion 62 of the support stake is cut longitudinally to define a central support finger 64 having substantially parallel edges 66 and 68. The central support finger is also provided with a fastener hole 65 to permit fasteners, such as screws, to be extended through the fastener holes to secure the landscape strip material to the support stakes. In the case of the support stake 54 the central web portion of the support stake is longitudinally cut to defined a spaced pair of support fingers 55 and 57 which are of similar geometry and serve the same purpose as the central support finger 64 of the support stake 56. The central support finger is bent to form a laterally projecting section 70 that is integral with the central web 60 and provides a stop for the lower edge 13 of the landscape strip material 12. The laterally projecting section 70 is of sufficient dimension to accommodate the width of the landscape strip material 12 between the central support finger and the central web portion of the stake. The upper ends of the rounded or offset edge portions 58 and 60 are inclined as shown at 72 so that the support stake will have no abrupt upper edges or sharp corners at the upper ends that might constitute a hazard during installation and use of the landscape edging system. At the lower end portions of the support stakes 54 and 56 the central web 62 and the rounded or offset edges of the stake are cut away during the punching or stake forming operation to define downwardly converging substantially straight edges 74 and 76 which intersect to form a centrally located point 78.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. A landscape edging system, comprising:
landscape edging strip material having end portions each defining a laterally extending projection, the end portions of adjacent strips of landscape edging material having overlapping relation when assembled and having end edges disposed in edge to edge relation;
a pair of stake clip members being mounted one to each of said laterally extending projections and each defining a stake receptacle, said stake clip members positioning said stake receptacles in vertically aligned relation when said end portions of adjacent strips of landscape edging material are positioned in overlapping edge to edge relation;
an installation stake member extending through said vertically aligned stake receptacles and maintaining said end portions of adjacent strips of landscape edging material in said overlapping edge to edge relation and supporting said landscape edging strip material in substantially co-planar relation;
a support stake having supporting relation with said landscape edging strip material and having a generally planar stake body having offset generally parallel edges enhancing the structural integrity of said support stake along the length thereof; and
a support finger being integral with said generally planar stake body, projecting laterally from said generally planar stake body and having a portion thereof projecting upwardly and in laterally offset relation with said generally planar stake body, said support finger and said generally planar stake body defining a landscape strip support receptacle located to one side of and in substantially parallel relation with said generally planar stake body and being of a dimension receiving a portion of said landscape edging strip material in supported relation therein.

2. The landscape edging system of claim 1, comprising:
said landscape edging strip material being composed of a polymer composition; and
said pair of stake clip members each having a plurality of strip penetrating fingers each penetrating said landscape edging strip material sufficiently to retain said stake clip members in permanently mounted relation with said landscape edging strip material.

3. The landscape edging system of claim 2, comprising:
said landscape edging strip material being composed of an extruded polymer material having a thickness in the range of from about 3/16 inch to about 1/2 inch and a width in the range of from about 3 inches to about 5 inches and having a decorative surface geometry.

4. The landscape edging system of claim 1, comprising:
said stake receptacles of said pair of stake clip members defining at least one inclined internal side surface portion and an angulated outer edge portion; and
said installation stake member having at least one inclined angulated external edge having an angle corresponding with said angulated outer edge portion and interacting with said at least one inclined internal surface of each of said stake clip members and establishing predetermined positioning of said overlapping end portions and said end edges of said landscape edging strip material.

5. The landscape edging system of claim 1, comprising:
said stake clip members each having a laterally projecting central portion and downwardly converging internal side surfaces defining internally tapered stake receptacles; and
said installation stake member defining opposed downwardly converging external edges interacting with said downwardly converging internal side surfaces of each of said internally tapered stake receptacles and establishing predetermined positioning of said overlapping end portions and said end edges of said landscape edging strip material.

6. The landscape edging system of claim 1, comprising:
said pair of stake clip members being composed of sheet metal material that is formed by a stamping operation to define a laterally projecting generally planar central portion and downwardly converging internal side surfaces defining internally tapered stake receptacles; and
said installation stake member being of generally planar configuration being moveable within said internally tapered stake receptacles and having opposed downwardly converging side edges establishing reactive engagement with said downwardly converging internal side edges of said internally tapered stake receptacles and maintaining aligned assembly of said overlapping end portions and said end edges of said landscape edging strip material.

7. The landscape edging system of claim 1, comprising:
said support finger defining a fastener hole receiving a fastener member securing said support stake and said landscape edging strip material in assembly.

8. A landscape edging system, comprising:
landscape edging strip material having end portions each defining a laterally extending projection, the end portions of adjacent strips of landscape edging material having overlapping relation when assembled and having end edges disposed in edge to edge relation, said landscape edging strip material being composed of a material of sufficient softness for penetration thereof;
a pair of stake clip members each being formed of sheet metal and having a plurality of penetrating fingers projecting therefrom, said penetrating fingers of said pair of stake clip members penetrating said laterally extending projections and fixing said stake clip members thereto, each of said stake clip members defining a stake receptacle, said stake clip members positioning said stake receptacles in vertically aligned relation when said end portions of adjacent strips of landscape edging material are positioned in overlapping edge to edge relation;
an installation stake member extending through said vertically aligned stake receptacles and maintaining said end portions of adjacent strips of landscape edging material in said overlapping edge to edge relation and supporting adjacent strips of said landscape edging strip material in substantially co-planar relation;
a support stake having supporting relation with said landscape edging strip material and having a generally planar stake body having offset generally parallel edges enhancing the structural integrity of said support stake along the length thereof; and
a support finger being integral with said generally planar stake body, projecting laterally from said generally planar stake body and having a portion thereof projecting upwardly, said support finger and said generally planar stake body defining a receptacle disposed in substantially parallel and laterally offset relation with said generally planar stake body and being of a dimension receiving a portion of said landscape edging strip material in supported relation therein.

9. The landscape edging system of claim 8, comprising:
said landscape edging strip material being composed of an extruded polymer material having a thickness in the range of from about 3/16 inch to about 1/2 inch and a width in the range of from about 3 inches to about 5 inches and having a decorative surface geometry.

10. The landscape edging system of claim 8, comprising:
said stake receptacles of said pair of stake clip members defining at least one inclined internal surface; and
said installation stake member having at least one inclined external edge interacting with said at least one inclined internal surface of each of said stake clip members and establishing predetermined positioning of said overlapping end portions and said end edges of said landscape edging strip material.

11. The landscape edging system of claim 8, comprising:
said stake clip members each having a laterally projecting central portion and downwardly converging internal side surfaces defining internally tapered stake receptacles; and
said installation stake member defining opposed downwardly converging external edges interacting with said downwardly converging internal side surfaces of each of said internally tapered stake receptacles and establishing predetermined positioning of said overlapping end portions and said end edges of said landscape edging strip material.

12. The landscape edging system of claim 8, comprising:
said pair of stake clip members being composed of sheet metal material that is formed by a stamping operation to define a laterally projecting generally planar central portion and downwardly converging internal side surfaces defining internally tapered stake receptacles; and
said installation stake member being of generally planar configuration being moveable within said internally tapered stake receptacles and having opposed downwardly converging side edges establishing reactive engagement with said downwardly converging internal side edges of said internally tapered stake receptacles and maintaining aligned assembly of said overlapping end portions and said end edges of said landscape edging strip material.

13. The landscape edging system of claim 8, comprising:
said support finger defining a fastener hole receiving a fastener member securing said support stake and said landscape edging strip material in assembly.

\* \* \* \* \*